(12) United States Patent
Takizawa et al.

(10) Patent No.: US 9,592,547 B2
(45) Date of Patent: Mar. 14, 2017

(54) METHOD OF MANUFACTURING ANNULAR MOLDING

(71) Applicant: MITSUBISHI MATERIALS CORPORATION, Tokyo (JP)

(72) Inventors: Hideo Takizawa, Kitamoto (JP); Yuji Ishiwari, Okegawa (JP); Hiroaki Kikuchi, Okegawa (JP); Jun Ohsone, Kitamoto (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 418 days.

(21) Appl. No.: 13/709,388

(22) Filed: Dec. 10, 2012

(65) Prior Publication Data
US 2014/0157851 A1 Jun. 12, 2014

(51) Int. Cl.
*B21H 1/06* (2006.01)
*B21J 1/02* (2006.01)
(Continued)

(52) U.S. Cl.
CPC .............. *B21H 1/06* (2013.01); *B21J 1/025* (2013.01); *B21K 1/28* (2013.01); *B23P 15/006* (2013.01); *B21J 1/04* (2013.01); *B21J 5/02* (2013.01)

(58) Field of Classification Search
CPC .. B21H 1/06; B21B 5/00; B21B 17/02; B21D 22/16; B21J 9/025; B21J 1/02; B21J 1/025; B21J 1/05; B21J 5/02; B21J 5/06
(Continued)

(56) References Cited

U.S. PATENT DOCUMENTS

| | | | | |
|---|---|---|---|---|
| 5,620,537 A | * | 4/1997 | Bampton | B21J 5/002 148/564 |
| 7,721,611 B2 | * | 5/2010 | Salama | 73/862.627 |
| 8,187,532 B2 | * | 5/2012 | Ohsone et al. | 420/448 |

FOREIGN PATENT DOCUMENTS

| | | |
|---|---|---|
| JP | 61-132241 A | 6/1986 |
| JP | 62-211333 A | 9/1987 |

(Continued)

OTHER PUBLICATIONS

"Report of survey in FY 2002, Report of survey and study relating to revolutionary component development using very large scale forging press," New Energy and Industrial Technology Development Organization Consignee Sokeizai Center, Mar. 2003, pp. 10,11, 37-41 and English translation thereof.
(Continued)

*Primary Examiner* — David Bryant
*Assistant Examiner* — Pradeep C Battula
(74) *Attorney, Agent, or Firm* — Locke Lord LLP; James E. Armstrong, IV; Nicholas J. DiCeglie, Jr.

(57) ABSTRACT

A method of manufacturing an annular material includes: a forging process of making a discoid forged material by forging an alloy material; and a ring rolling process of making an annular material by performing ring rolling on an annular intermediate made by forming a through-hole in the forged material. In the forging process, hot forging which achieves an absolute value $\epsilon\theta 1$ of a strain in a circumferential direction of the forged material that is greater than or equal to 0.3, an absolute value $\epsilon h$ of a strain in a height direction of the forged material that is greater than or equal to 0.3, and a ratio $\epsilon h/\epsilon\theta 1$ between the absolute values of the strains that is in a range of 0.4 to 2.5 is performed at least two or more times.

9 Claims, 6 Drawing Sheets

(51) Int. Cl.
    *B23P 15/00*    (2006.01)
    *B21K 1/28*    (2006.01)
    *B21J 5/02*    (2006.01)
    *B21J 1/04*    (2006.01)

(58) Field of Classification Search
    USPC ..... 72/206, 68, 80, 89, 82, 84, 96, 102, 106
    See application file for complete search history.

(56) References Cited

FOREIGN PATENT DOCUMENTS

| | | |
|---|---|---|
| JP | 03-169445 A | 7/1991 |
| JP | 04-071703 A | 3/1992 |
| JP | 07-138719 A | 5/1995 |
| JP | 2000-015326 A | 1/2000 |
| JP | 2001-152277 A | 6/2001 |
| JP | 2009-299120 A | 12/2009 |

OTHER PUBLICATIONS

Notice of Reasons for Rejection mailed May 13, 2014, issued for the Japanese patent application No. 2010-133161 and English translation thereof.

\* cited by examiner

METHOD OF MANUFACTURING ANNULAR MOLDING

BACKGROUND OF THE INVENTION

Field of the Invention

The present invention relates to a method of manufacturing an annular material represented by a turbine disk of an engine for an aircraft. Particularly, the present invention relates to a manufacturing method related to an annular material having excellent uniformity.

Background Art

Hitherto, an annular material made of an alloy such as a Ni-based alloy, a Fe-based alloy, or a Co-based alloy is known. For example, an annular material made of a Ni-based alloy having excellent high-temperature strength is used in a turbine disk of an engine for an aircraft, and the turbine disk as a product is manufactured by machining the annular material.

A plurality of turbine blades is arranged in the outer circumference portion of the turbine disk along the circumferential direction. In the engine for an aircraft, as high-temperature and high-pressure combustion gas generated in the engine flows from the front side to the rear side in the axial direction thereof in the outer circumference portion of the turbine disk, the turbine blades are rotated at high speed along with the turbine disk. The driving force of the rotation is transmitted to a compressor and fans arranged on the front side of the turbine disk, thereby obtaining compressed air and propulsion needed for continuous combustion.

The turbine disk is positioned in an important rotating part, and the annular material used in the turbine disk requires sufficient mechanical strength. Specifically, in the turbine disk, the outer circumference portion thereof is exposed to the combustion gas and is thus at a high temperature of about 600 to 700° C., while the temperature of the inner circumference portion is suppressed to be relatively low. As a result, as the engine starts up and stops, thermal stress repeatedly occurs therein. Therefore, the turbine disk requires excellent low-cycle fatigue property and needs to also have high creep strength property because the outer circumference portion thereof receives centrifugal force caused by high-speed rotation about the shaft at high temperature. In addition, the turbine disk also requires high tensile and yield strength.

In order to ensure mechanical strength capable of responding to such various demands, the annular material used in the turbine disk is generally manufactured by forging (forging press) (for example, refer to Japanese Patent Application, First Publication No. H07-138719 and Japanese Patent Application, First Publication No. S62-211333). That is, by applying strain to the annular material through forging and increasing the fineness of the grains thereof, tensile strength, fatigue strength, and the like are enhanced. As a facility applied to forging, a hydraulic control forging press which enables strict control of forging speed is desired. In order to obtain the uniformity in the circumferential direction of the structure (grains) in the annular material, it is recognized that application of entire surface forging in which the entire element is made at the same time is preferable.

In recent years, due to demand for an increase in the output of the engine for an aircraft, an increase in the size of the turbine disk is required. In a case of increasing the size of the annular material due to the increase in the size of the turbine disk, a large-sized hydraulic control forging press of several tens of kilotons class, is needed (for example, refer to "an investigation and research report on the development of an innovative member using a supersized press machine for forging as an investigation report in 2002", by New Energy and Industrial Technology Development Organization, March, 2003, p. 10, 11, and 37 to 41).

However, the large-sized hydraulic control forging press described above is very expensive and rare in the world. Therefore, in a case of using such a large-sized hydraulic control forging press, a supply capability of the annular material is limited, and the product cost is maintained at a high level. In addition, the tendency to increase the size of the turbine disk in recent years becomes to a degree at which closed die forging is difficult although the large-sized hydraulic control forging press is used, and thus it is difficult to obtain desirable mechanical property in a partial region of the annular material subjected to the forging and it is difficult to ensure uniformity of the structure thereof.

On the other hand, instead of manufacturing the annular material using a forging press, a making method through ring rolling is considered. In this case, facility costs may be reduced, and it is easy to cope with the increase in the size of the annular material. However, in general, ring-rolled product is more likely than a press-forged product to have anisotropy of mechanical property (strength property) and this is not appropriate for a product that requires isotropy of mechanical property as in the turbine disk.

In addition, a method of making an annular material by combining forging press and ring rolling is also considered. However, in order to obtain a desired uniform and fine structure, there is a need to further perform final forging after the ring rolling, and thus the manufacturing process becomes complex and the manufacturing costs are increased.

SUMMARY OF THE INVENTION

An object of the present invention is to provide a method of manufacturing an annular material capable of reducing facility costs and manufacturing costs while ensuring uniformity of a structure and sufficiently increasing mechanical strength.

In order to accomplish the above-mentioned object, the inventors of the present invention intensively examined a method of manufacturing an annular material and as a result, obtained the following findings.

In general, a ring-rolled product is made by performing preform forging on an alloy material such as a billet and performing ring rolling on an annular intermediate made by boring a through-hole through a forged material obtained by the forging. The mechanical property of the ring-rolled product according to the related art is controlled by applying sufficiently high reduction ratios in a ring rolling process. Work conditions and the like in the ring rolling process are set with an emphasis on whether high reduction ratios can be provided at an appropriate temperature region. On the other hand, in a forging process of making the forged material, the above-mentioned reduction ratios were not particularly considered. Specifically, there is recognition that the made forged material may have a size capable of being inserted into a ring rolling equipment and being provided with desired reduction ratios in the ring rolling process.

The annular material used in a product positioned in important rotating parts such as the turbine disk requires sufficiently mechanical strength. In order to obtain sufficient mechanical strength, a uniform and fine grain structure has to be realized. However, in case of making through a making method according to the related art in which high reduction ratios are exerted in the ring rolling process, even though a structure including fine equiaxed grains is obtained as a result of the ring rolling, the generation of strong anisotropy of strength property caused by exerting a high strain cannot be avoided. When such anisotropy occurs in the structure of the annular material, it is difficult to sufficiently obtain mechanical strength. On the other hand, when strain to be exerted is limited in order to avoid the generation of anisotropy, a desired uniform and fine structure may not be obtained. Therefore, when ring rolling is to be applied, there is a need to perform complex processes including preform forging, ring rolling, and finish forging.

The inventors obtained findings that providing high reduction ratios in the ring rolling process in which significant plastic deformation has to be completed in the circumferential direction compared to the height direction or the radial direction of an annular intermediate results in providing anisotropy of strength property to the structure of the annular material. That is, the inventors found that isotropy of strength property in the annular material can be enhanced and a desired uniform and fine structure is obtained by suppressing the reduction ratios in the ring rolling process and applying high reduction ratios in a forging process before the ring rolling process. According to this, a desired annular material is obtained by relatively simple work processes including only preform forging and ring rolling.

A method of manufacturing an annular material according to a first aspect of the present invention includes: a forging process of making a discoid forged material by forging an alloy; and a ring rolling process of making an annular material by performing ring rolling on an annular intermediate made by forming a through-hole in the forged material. In the forging process, hot forging which achieves an absolute value $\epsilon\theta 1$ of a strain in a circumferential direction of the forged material that is greater than or equal to 0.3, an absolute value $\epsilon h$ of a strain in a height direction of the forged material that is greater than or equal to 0.3, and a ratio $\epsilon h/\epsilon\theta 1$ between the absolute values of the strains that is in a range of 0.4 to 2.5 is performed at least two or more times.

According to the first aspect, by setting the absolute value $\epsilon\theta 1$ of the strain in the circumferential direction and the absolute value $\epsilon h$ of the strain in the height direction exerted to the alloy during the forging process to be large, the ratio of the strain amount in the circumferential direction exerted to the annular intermediate during the subsequent ring rolling process may be reduced. In addition, during the ring rolling, the strain amount in the height direction which is difficult to be exerted is sufficiently ensured. Accordingly, the anisotropy of the mechanical property of the made annular material is suppressed and the isotropy thereof is increased, thereby obtaining a fine grain structure in which uniformity is sufficiently ensured.

The ratio $\epsilon h/\epsilon\theta 1$ represents a directional balance of the exerted strain and is an index to control the relative positional change in the material before and after forging or ring rolling process. In the subsequent ring rolling process, due to the making method, the corresponding numerical value must be zero or a numerical value close to zero. Therefore, taking an appropriate strain exertion ratio in the height direction during the forging process is necessary to suppress anisotropy, but when the $\epsilon h/\epsilon\theta 1$ is less than 0.4, the effect is insufficient. On the other hand, when the $\epsilon h/\epsilon\theta 1$ has a numerical value higher than 2.5, the distribution in the height direction becomes excessive, the plastic flow becomes unstable, and thus axisymmetry of the plastic flow which is essential to apply uniformity is reduced.

In the method of manufacturing an annular material according to a second aspect of the present invention, in the ring rolling process, hot rolling in which 0.5 or higher of the absolute value $\epsilon\theta 2$ of the strain in the circumferential direction in the annular material is exerted is performed, and a grain size of a product region in the annular material is greater than or equal to 8 in terms of ASTM grain size number.

According to the second aspect, the grain size of the product region which becomes a product through machining in the annular material is greater than or equal to 8 in terms of ASTM grain size number thus fineness is reliably increased. Therefore, the mechanical strength of the product obtained from the annular material is reliably increased.

The ASTM grain size number is determined by the standard specified in ASTM standard E122 of American Society of Testing and Materials.

In the method of manufacturing an annular material according to a third aspect of the present invention, a grain size difference in the product region of the annular material in a cross-section including an axial line of the annular material is in a range of ±2 as an ASTM grain size number difference.

According to the third aspect, since the differences between the grain sizes in the product region of the cross-section of the annular material are in a range of ±2 as ASTM grain size number differences, the annular material sufficiently ensures the uniformity of grain size in the radial direction and the height direction.

In the method of manufacturing an annular material according to a fourth aspect of the present invention, in the forging process, a grain size of the forged material is caused to be greater than or equal to 7 in terms of ASTM grain size number.

According to the fourth aspect, during the forging process, by exerting a high strain amount as described above, the grain size of the forged material is greater than or equal to 7 in terms of ASTM grain size number, and thus the fineness is increased. Therefore, it is possible to increase the fineness of the structure of the annular material while reducing the strain amount exerted during the subsequent ring rolling process.

In the method of manufacturing an annular material according to a fifth aspect of the present invention, the annular intermediate is made so that a ratio T/H of a thickness T in a radial direction in the annular intermediate and a height H along an axial direction of the annular intermediate is in a range of 0.6 to 2.3 and is thereafter subjected to ring rolling to cause a grain size difference between a plurality of equivalent positions equally set in the circumferential direction in the annular material to be in a range of ±1.5 as an ASTM grain size number difference.

According to the fifth aspect, since the difference between the grain sizes of the equivalent positions in the circumferential direction of the annular material may be suppressed to be in a range of ±1.5 as an ASTM grain size number difference, the annular material obtained by making the annular intermediate sufficiently ensures the uniformity of grain sizes in the circumferential direction. Specifically, the ring rolling is local processing but is different from general partial forging. It is known that since the ring rolling processes continuity, the axisymmetry of the structure after rolling is high and the deviation of the material property in the circumferential direction in the annular material is reduced. By setting the ratio T/H in the annular intermediate before the ring rolling to be in the above-described range, the axisymmetry of the shape (roundness) and the micro structure of the made annular material may be further increased.

That is, since the ratio T/H is in the range of 0.6 to 2.3, stability of rolling that is necessary to provide uniformity is caused. Specifically, in a region in which the T/H is less than 0.6, the contact area between the two rolls (a main roll and a mandrel roll) that perform rolling and the material is increased, the effect of heat removal is relatively increased, and thus it is difficult to obtain the uniformity in the circumferential direction. On the other hand, as the T/H is increased, buckling is more likely to occur. Specifically, in a region in which the T/H is higher than 2.3, the tendency is strengthened, and thus it is difficult to obtain the uniformity in the circumferential direction.

According to the method of manufacturing an annular material according to the present invention, facility costs and manufacturing costs may be reduced while ensuring uniformity of the micro structure and sufficiently increasing mechanical strength.

PREFERRED EMBODIMENTS

Hereinafter, an embodiment of the present invention will be described with reference to the accompanying drawings.

An annular material 10 according to this embodiment is used as a work material for making a turbine disk of an engine for an aircraft.

Figure 1:
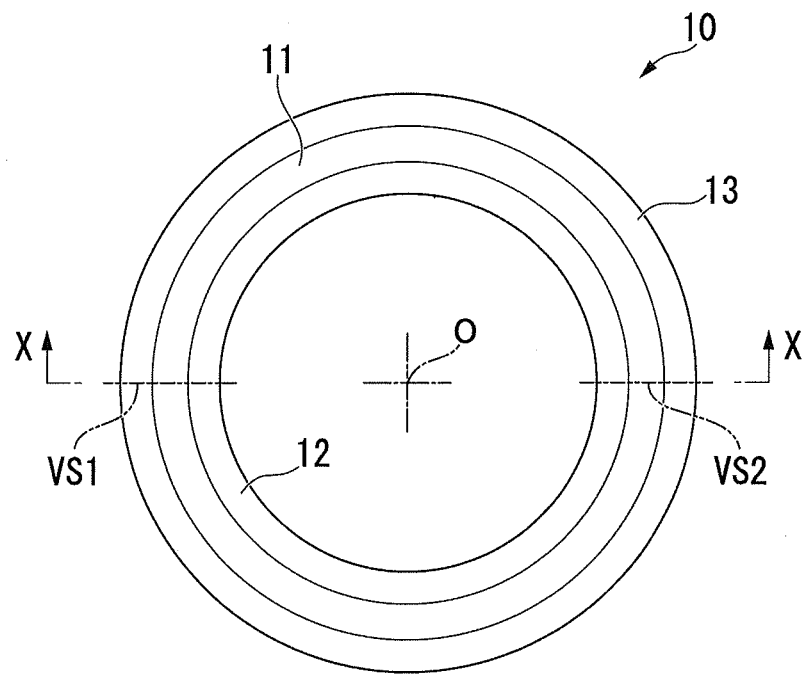
FIG. 1 is a top view of an annular material according to an embodiment of the present invention.
Figure 2:
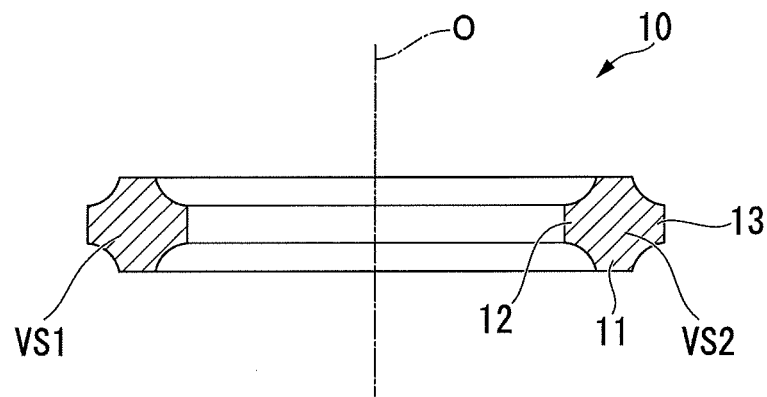
FIG. 2 is a cross-sectional view taken along the line X-X in FIG. 1.

As illustrated in FIGS. 1 and 2, the annular material 10 has an annular shape having a through hole and an axial line O as a center and includes a main body 11, an inside protruding strip portion 12 that protrudes inward in a radial direction from the main body 11, and an outside protruding strip portion 13 that protrudes outward in the radial direction from the main body 11.

The annular material 10 is configured of a Ni-based alloy having excellent heat resistance, and in this embodiment, is configured of a Ni-based alloy Alloy 718.

The alloy composition of the Ni-based alloy Alloy 718 includes: 50.00 to 55.00 mass % of Ni: 17.0 to 21.0 mass % of Cr; 4.75 to 5.60 mass % of Nb; 2.8 to 3.3 mass % of Mo; 0.65 to 1.15 mass % of Ti; 0.20 to 0.80 mass % of Al; 0.01 to 0.08 mass % of C; and the balance including Fe and inevitable impurities.

The grain size of the micro structure of the annular material 10 in a desirable region (not shown) that becomes a turbine disk (product) through machining (hereinafter, referred to as a "product region") is greater than or equal to ASTM No. 8 in terms of ASTM grain size number. Virtual planes VS1 and VS2 illustrated in FIG. 2 are cross-sectionals including the axial line O of the annular material 10. The virtual planes VS1 and VS2 are set to equivalent positions that equally halve the annular material 10 in the circumferential direction. In the annular material 10, the differences between the grain sizes of the structure in the product region in the cross-section of the virtual plane VS1 (or VS2) are in a range of ±2 as ASTM grain size number differences and thus uniformity is ensured. The difference between the grain sizes of the equivalent positions in the circumferential direction of the annular material 10, that is, the difference between the grain size in the virtual plane VS1 and the grain size in the virtual plane VS2 is in a range of ±1.5 as an ASTM grain size number difference.

The annular material 10 configured as such ensures a sufficient isotropy of the mechanical property.

Next, a method of manufacturing the annular material 10 and a method of manufacturing a turbine disk will be described with reference to FIGS. 3 to 7.

(Melting and Casting Process S1)

First, a melted metal of the Ni-based alloy Alloy 718 is made. A melted raw material is prepared to achieve the composition range of the Ni-based alloy Alloy 718 described above, and is subjected to vacuum induction melting (VIM), thereby making an ingot. Next, the ingot is subjected to electro-slag remelting (ESR), thereby making an ingot again. Moreover, the ingot is subjected to vacuum arc remelting (VAR), and thereafter is subjected to hot forging, thereby making a columnar billet.

The billet is made, for example, a diameter of about 7 inches to 12 inches. The structure of the made billet has an ASTM grain size number of about ASTM No. 6. As described above, by performing the three melting processes (triple melting processes), a high-cleanliness billet in which the solidified structure is controlled to have low level segregation of the alloy components and in which inclusions are excessively low is made.

(Forging Process S2)

Next, the billet is subjected to forging so as to be pressed in the axial line direction of the billet, thereby making a discoid forged material. As the forging work, hot forging is performed in a condition where the temperature of the billet is heated to, for example, 950° C. to 1075° C. so that the absolute value $\epsilon\theta 1$ of the strain in the circumferential direction of the forged material is greater than or equal to 0.3, the absolute value $\epsilon h$ of the strain in the height direction of the forged material is greater than or equal to 0.3, and the ratio $\epsilon h/\epsilon\theta 1$ between the absolute values of the strains is in a range of 0.4 to 2.5, and the hot forging is performed at least twice.

A method of calculating the absolute values of the strains will be described with reference to FIG. 10.

(Method of Calculating Absolute Value of Strain)

Figure 10:
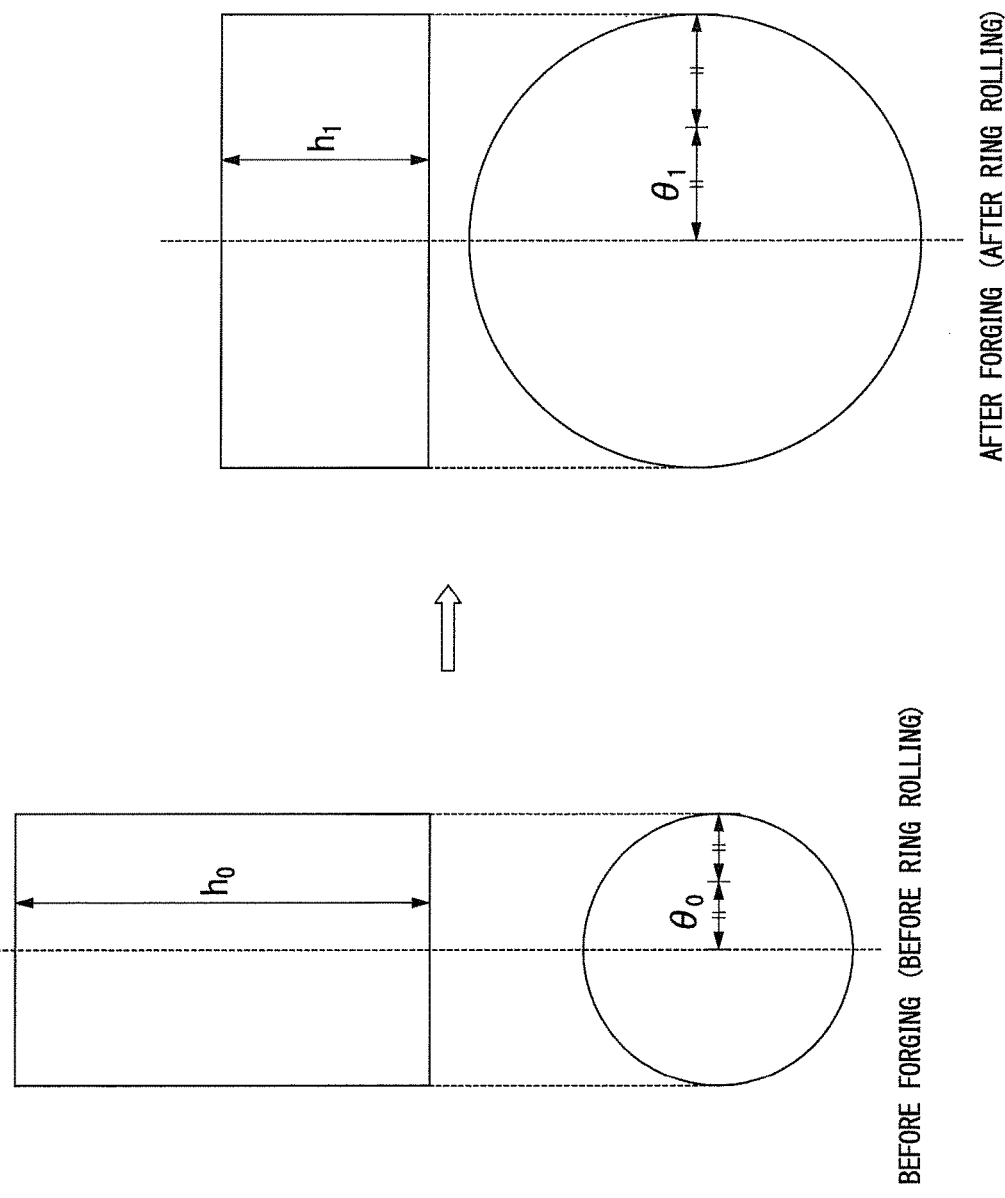
FIG. 10 is a diagram for explaining a method of calculating a strain according to the embodiment of the present invention.

As illustrated in FIG. 10, the absolute value $\epsilon h$ of the strain in the height direction of the forged material may be expressed as the following expression (1) from the length $h_0$ in the height direction before forging and the height $h_1$ after forging.

$$|\varepsilon h| = \left|\ln\left(\frac{h_1}{h_0}\right)\right| \quad (1)$$

The absolute value $\varepsilon\theta$ of the strain in the circumferential direction of the forged material (the annular material) may be expressed as the following expression (2) from the average radius $\theta_0$ before forging (before ring rolling) and the average radius $\theta_1$ after forging (after ring rolling).

$$|\varepsilon\theta| = \left|\ln\left(\frac{\theta_1}{\theta_0}\right)\right| \quad (2)$$

The average radius described above represents half the radius in a case of a solid material and an average value of inside and outside radius in a case of a ring.

By solving the expressions (1) and (2), the absolute value $\varepsilon h$ of the strain in the height direction of the forged material, the absolute value $\varepsilon\theta 1$ of the strain in the circumferential direction of the forged material, the absolute value $\varepsilon\theta 2$ of the strain in the circumferential direction of the annular material may be obtained.

Specifically, in the forging process, the absolute value $\varepsilon\theta 1$ of the strain amount exerted in the circumferential direction of the forged material is set to be in a range of 0.3 to 1.3. The absolute value $\varepsilon h$ of the strain amount exerted in the height direction along the axial line direction the forged material is set to be in a range of 0.3 to 1.3. Through the forging, the height of the forged material is adjusted to be about, for example, 60 mm to 500 mm. Due to the forging process, a sufficient strain is exerted onto the forged material, and thus the grain size of the forged material is greater than or equal to 7 in terms of ASTM grain size number, thereby achieving an increase in the fineness.

(Boring Work and Intermediate Ring Rolling Process S3)

Next, in the center portion of the obtained forged material, a through-hole having a circular cross-section is formed by a water cutter. Moreover, intermediate ring rolling is performed after forming the through-hole if necessary. By the boring work and intermediate ring rolling process S3, an annular intermediate 20 is made.

Figure 4:
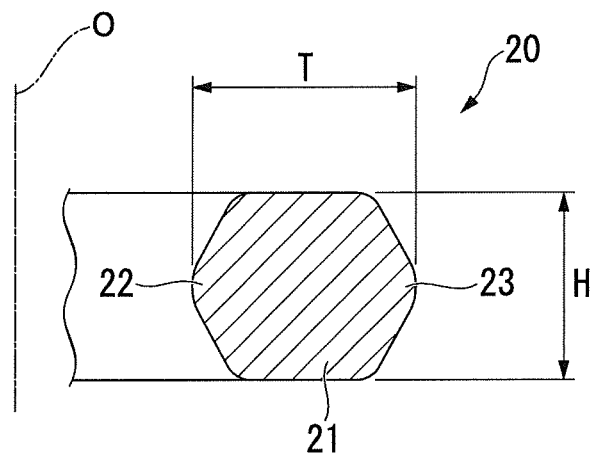
FIG. 4 is a cross-sectional view of an annular intermediate used in the manufacturing method shown in FIG. 3.

In this embodiment, as illustrated in FIG. 4, the annular intermediate 20 has an approximately polygonal cross-section that is orthogonal in the circumferential direction, and includes a base material 21 having an upper surface and a lower surface extending in a direction substantially orthogonal to the axial line O, an inside protruding portion 22 protruding inward in the radial direction from the base material 21, and an outside protruding portion 23 protruding outward in the radial direction from the base material 21.

Specifically, the height H along the axial line O direction of the annular intermediate 20 (base material 21) is set to be in a range of H=60 to 500 mm. The annular intermediate 20 is made so that the ratio T/H of the thickness T in the radial direction orthogonal to the axial line O thereof to the height H is in a range of 0.6 to 2.3.

(Ring Rolling Process S4)

Next, ring rolling is performed on the annular intermediate 20. The ring rolling is performed as hot rolling. The temperature of the hot rolling is, for example, in a range of 900 to 1050° C.

Figure 5:
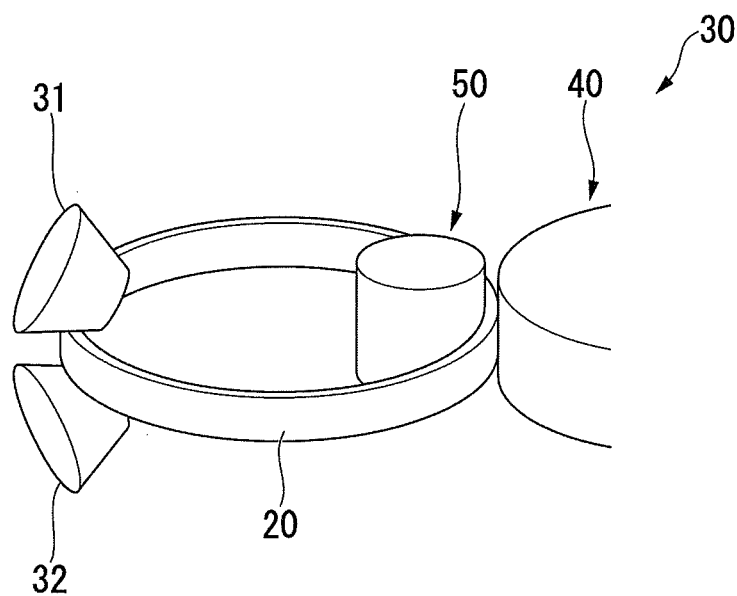
FIG. 5 is an explanatory view of ring rolling used in the manufacturing method shown in FIG. 3.

As illustrated in FIG. 5, the ring rolling equipment 30 includes a main roll 40 disposed on the outer circumference side of the annular intermediate 20, a mandrel roll 50 disposed on the inner circumference side of the annular intermediate 20, and a pair of axial rolls 31 and 32 that abut on the end surfaces (in this embodiment, the upper surface and the lower surface of the base material 21) in the axial line O direction of the annular intermediate 20.

The main roll 40 and the mandrel roll 50 are arranged so that the rotational axis thereof are parallel to each other and are configured to cause the annular intermediate 20 to be interposed therebetween from the inner circumference side and the outer circumference side and pressed, and roll the annular intermediate 20 while being rotated in the circumferential direction. The pair of axial rolls 31 and 32 are configured to cause the annular intermediate 20 to be interposed therebetween and pressed in the axial line O direction to control the height dimension of the annular intermediate 20.

Figure 6:
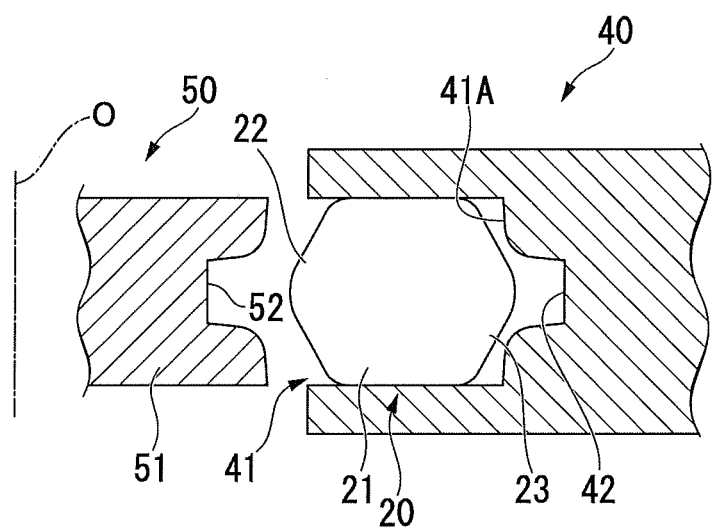
FIG. 6 is an explanatory view of a ring rolling process using a main roll and a mandrel roll.

As illustrated in FIG. 6, the outer circumference portion of the main roll 40 is provided with an accommodation recessed portion 41 capable of accommodating a part of the annular intermediate 20. In this embodiment, the accommodation recessed portion 41 has such a depth to be able to accommodate the outside protruding portion 23, the base material 21, and the outer circumference part of the inside protruding portion 22 of the annular intermediate 20. In a back portion 41A of the accommodation recessed portion 41, a first groove 42 for making the outside protruding strip portion 13 of the annular material 10 is formed to be recessed inward in the radial direction (to the right in FIG. 6) in the main roll 40. The first groove 42 has a depth the same as the protruding depth of the outside protruding strip portion 13 to be made.

On the other hand, a fit-in portion 51 configured to be able to be fitted in the accommodation recessed portion 41 of the main roll 40 is provided in the outer circumference portion of the mandrel roll 50, and a second groove 52 for making the inside protruding strip portion 12 of the annular material 10 is formed in the outer circumference surface of the fit-in portion 51 to be recessed inward in the radial direction (to the left in FIG. 6) in the mandrel roll 50. The second groove 52 has a depth the same as the protruding depth of the inside protruding strip portion 12 to be made.

As the main roll 40 and the mandrel roll 50 having such configurations operate to approach each other, the annular intermediate 20 is interposed and pressed between the main roll 40 and the mandrel roll 50. Specifically, as the main roll 40 and the mandrel roll 50 approaches each other while the main roll 40 is rotated about the rotational axis of the main roll 40, the annular intermediate 20 is rotated about the axial line O by frictional resistance against the main roll 40.

On the other hand, the mandrel roll 50 is configured to be rotatable about the rotational axis of the mandrel roll 50, and thus is driven to be rotated by frictional resistance against the annular intermediate 20. The annular intermediate 20 is plastically deformed to fill the accommodation recessed portion 41 and the first making groove 42 of the main roll 40, and the second groove 52 of the mandrel roll 50. As a result, the annular material 10 is made. Here, the inside protruding strip portion 12 in the annular material 10 is plastically deformed to correspond to the shape of the second groove 52. The outside protruding strip portion 13 is plastically deformed to correspond to the shape of the first groove 42.

Figure 7:
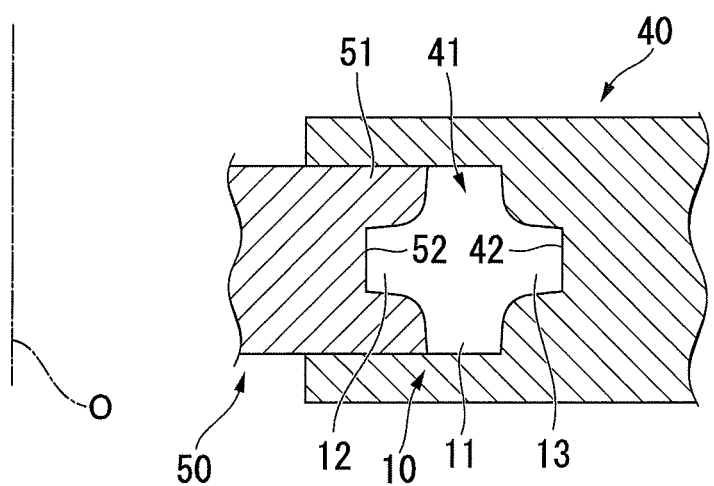
FIG. 7 is an explanatory view of the ring rolling process using the main roll and the mandrel roll.

By performing ring rolling as such, the annular intermediate 20 is plastically deformed to extend in the circumferential direction and the inside diameter and the outside diameter thereof are increased, thereby manufactured the annular material 10 illustrated in FIG. 7.

In the ring rolling process, 0.5 or higher of the absolute value $\epsilon\theta2$ of the strain in the circumferential direction in the annular material 10 is exerted. Specifically, by performing hot rolling at least one or more times, the total of the absolute value $\epsilon\theta2$ of the strain is set to be in a range of 0.5 to 1.3.

(Heat Treatment Process S5/Machining Process S6)

The annular material 10 made as described above has properties adjusted by a heat treatment, and is made into a final shape by machining to become a turbine disk for a gas turbine.

According to the annular material 10 configured as described above and the method of manufacturing the annular material, in the forging process for manufacturing a forged material by forging a billet, hot forging is performed at least two or more times so that the absolute value $\epsilon\theta1$ of the strain in the circumferential direction of the forged material is greater than or equal to 0.3, the absolute value $\epsilon h$ of the strain in the height direction of the forged material is greater than or equal to 0.3, and the ratio $\epsilon h/\epsilon\theta1$ between the absolute values of the strains is in a range of 0.4 to 2.5. As such, by setting the absolute value $\epsilon\theta1$ of the strain in the circumferential direction and the absolute value $\epsilon h$ of the strain in the height direction exerted to the billet during the forging process to be large, the ratio of the strain amount $\epsilon\theta2$ in the circumferential direction exerted to the annular intermediate 20 during the subsequent ring rolling process may be reduced. In addition, during the ring rolling, the strain amount in the height direction which is difficult to be exerted is sufficiently ensured. Accordingly, the anisotropy of the mechanical property of the made annular material 10 is suppressed and the isotropy thereof is increased, thereby obtaining a fine grain structure in which uniformity is sufficiently ensured.

The ratio $\epsilon h/\epsilon\theta1$ represents a directional balance of the exerted strain and is an index to control the relative positional change in the material before and after work. In the subsequent ring rolling process, due to the making method, the numerical value corresponding to the $\epsilon h/\epsilon\theta1$ must be zero or a numeral value close to zero. Therefore, taking an appropriate strain exertion ratio in the height direction during the forging process is necessary to suppress anisotropy, but when the $\epsilon h/\epsilon\theta1$ is less than 0.4, the effect is insufficient. On the other hand, when the $\epsilon h/\epsilon\theta1$ has a numerical value higher than 2.5, the distribution in the height direction becomes excessive, the plastic flow becomes unstable, and thus axisymmetry of the plastic flow which is essential to apply uniformity is reduced. Therefore, by setting the ratio $\epsilon h/\epsilon\theta1$ to be in a range of 0.4 to 2.5, the above-described effect is reliably obtained.

During the ring rolling process, by performing the hot forging to exert 0.5 or higher of the absolute value $\epsilon\theta2$ of the strain in the circumferential direction of the annular material 10, the grain size of the product region in the annular material 10 is greater than or equal to 8 in terms of ASTM grain size number and thus fineness is reliably increased. Therefore, the mechanical strength of the product obtained from the annular material 10 is reliably increased.

Since the differences between the grain sizes in the product region of the cross-section including the axial line O of the annular material 10 are in a range of ±2 as ASTM grain size number differences, the annular material 10 sufficiently ensures the uniformity of grain size in the radial direction and the height direction.

During the forging process, by exerting a high strain amount as described above, the grain size of the forged material is greater than or equal to 7 in terms of ASTM grain size number, and thus the fineness is increased. Therefore, it is possible to increase the fineness of the structure of the annular material 10 while reducing the strain amount exerted during the subsequent ring rolling process.

By performing ring rolling after making the annular intermediate 20 so that the ratio T/H between the thickness T in the radial direction and the height H in the annular intermediate 20 is in a range of 0.6 to 2.3, the difference between the grain sizes of the equivalent positions in the circumferential direction of the annular material 10 may be suppressed to be in a range of ±1.5 as an ASTM grain size number difference. That is, the annular material 10 obtained by making the annular intermediate 20 sufficiently ensures the uniformity of grain sizes in the circumferential direction.

Specifically, it is known that the ring rolling is local processing but is different from general partial forging and processes continuity, and thus the axisymmetry of the structure after making is high and the deviation of the material property in the circumferential direction in the annular material 10 is reduced. Here, as in this embodiment, by setting the ratio T/H in the annular intermediate 20 before the ring rolling to be in the above-described range, the axisymmetry of the shape (roundness) and the structure of the made annular material 10 may be further increased.

That is, since the ratio T/H is in the range of 0.6 to 2.3, stability of rolling that is necessary to provide uniformity is caused. Specifically, in a region in which the T/H is less than 0.6, the contact area between the two rolls (the main roll 40 and the mandrel roll 50) that perform rolling and the material is increased, the effect of heat removal is relatively increased, and thus it is difficult to obtain the uniformity in the circumferential direction. On the other hand, as the T/H is increased, buckling is more likely to occur. Specifically, in a region in which the T/H is higher than 2.3, the tendency is strengthened, and thus it is difficult to obtain the uniformity in the circumferential direction.

The present invention is not limited to the above-described embodiment, and various modifications may be added in a scope that does not depart from the gist of the present invention.

For example, the shapes of the annular material 10 and the annular intermediate 20 are not limited to this embodiment and may be appropriately subjected to design changes in consideration of the shape of the made turbine disk or the like.

The case where the annular material 10 and the annular intermediate 20 are configured of the Ni-based alloy Alloy 718 has been described, but the present invention is not limited thereto. The annular material 10 and the annular intermediate 20 may also be configured of other materials (for example, Waspaloy (Registered trademark) (United Technology Inc.), Alloy 720, a Co-based alloy, a Fe-based alloy, and the like).

The case where a melted metal of the Ni-based alloy Alloy 718 is made and a billet is made by casting has been described, but the present invention is not limited thereto. A configuration in which a billet is made by a powder making method and a forging process and a ring rolling process are performed on the billet may also be employed.

Instead of making the billet through the above-described triple melting processes, the billet may be made by double melting processes (VIM+ESR, or VIM+VAR).

In this embodiment, the case where the boring process of forming the through-hole in the center portion of the discoid forged material using the water cutter is included has been described, but the present invention is not limited thereto. The through-hole may also be formed by a method other than the water cutter. Otherwise, a through-hole is formed at the time of forging and the boring process itself may be omitted. In addition, boring using the water cutter or the like is possible in a stage during the forging process.

Figure 3:
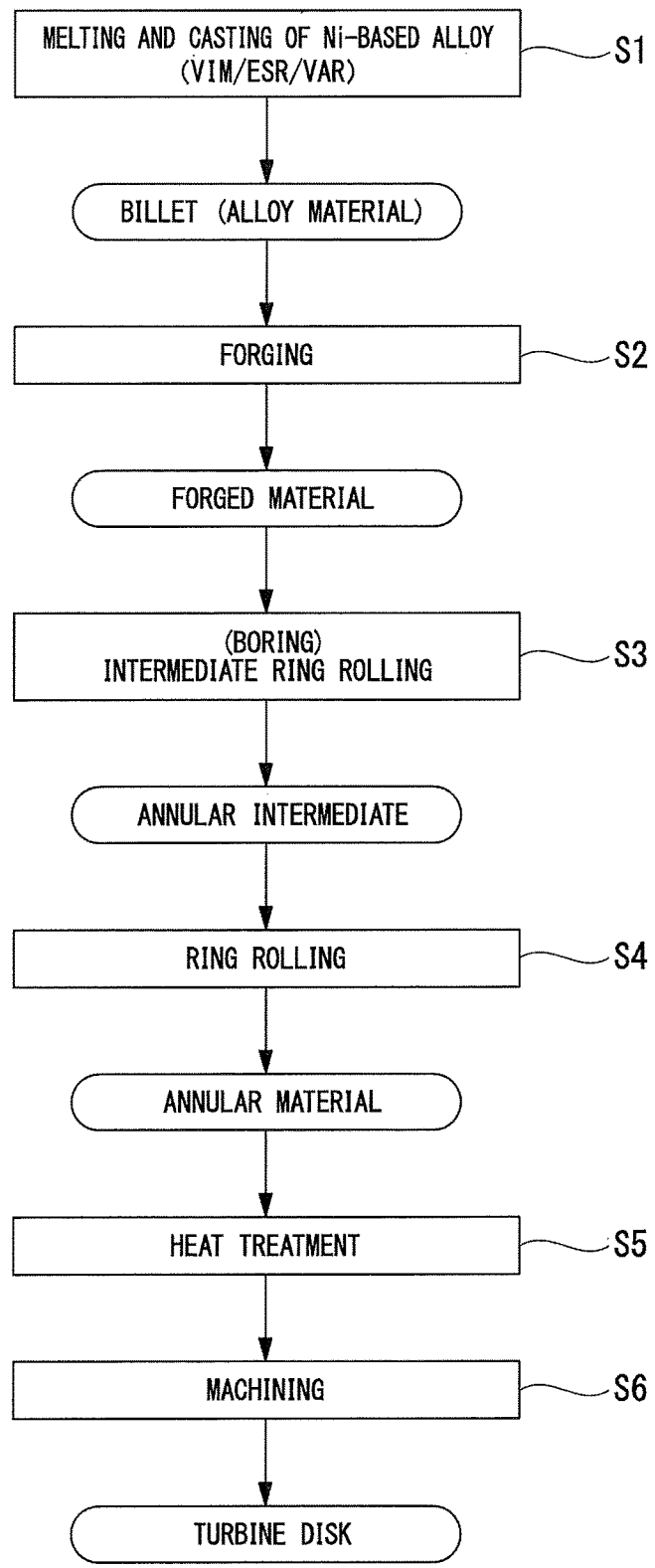
FIG. 3 is a flowchart showing a method of manufacturing an annular material and a turbine disk according to the embodiment of the present invention.

In FIG. 3, after the annular material 10 is made by the ring rolling process S4, work such as partial forging for the purpose of providing the shapes or adjusting the shape dimensions of the annular material 10 may be performed before the heat treatment process S5.

In this embodiment, using the equivalent positions (the virtual planes VS1 and VS2) that equally halve the annular material 10 in the circumferential direction, the difference between the grain sizes in the virtual plane VS1 and the grain size in the virtual plane VS2 is in a range of ±1.5 as an ASTM grain size number difference, but the number of virtual planes for comparison is not limited to two. That is, since the annular material 10 ensures the equivalence of the entire circumference in the circumferential direction, the present invention is not limited to the halving described above, the difference between the grain sizes of equivalent positions that are equally divided into three in the circumferential direction is also in the range of ±1.5 as an ASTM grain size number difference. In addition, in the annular material 10, the positions in the circumferential direction that set the equivalent positions are not limited.

EXAMPLES

Hereinafter, the present invention will be described in detail using Examples. Here, the present invention is not limited to the Examples.

Example 1

(Making of Specimen)

First, the melted metal of the Ni-based alloy Alloy 718 was made. Specifically, melting raw materials were prepared to achieve the composition range of the Ni-based alloy Alloy 718 described in the above-described embodiment. The melted metal was subjected to triple melting processes. Specifically, vacuum induction melting (VIM), electroslag remelting (ESR), and vacuum arc remelting (VAR) were performed thereon, thereby making a columnar billet having a diameter of ϕ254 mm.

Next, the forging process was performed on the billet, thereby making the discoid forged material. As the forging, the hot forging in which the billet was heated to a temperature of 1000° C. was performed twice. The first hot forging was performed so that the absolute value $\epsilon\theta 1$ of the strain in the circumferential direction of the forged material was 0.3, the absolute value $\epsilon h$ of the strain in the height direction of the forged material was 0.6, and the ratio $\epsilon h/\epsilon\theta 1$ between the absolute values of the strains was 2. The second hot forging was performed so that the absolute value $\epsilon\theta 1$ of the strain in the circumferential direction of the forged material was 1, the absolute value $\epsilon h$ of the strain in the height direction of the forged material was 0.7, and the ratio $\epsilon h/\epsilon\theta 1$ between the absolute values of the strains was 0.7.

Next, the through-hole was formed in the center portion of the forged material by the water cutter, thereby making the annular intermediate 20. The annular intermediate 20 was made so that the ratio T/H of the thickness T and the height H was TH=1.4.

Next, the ring rolling was performed on the annular intermediate 20. As the ring rolling, the hot rolling in which the annular intermediate 20 was heated to a temperature of 1000° C. was performed twice. Due to the hot rolling being performed twice, the total of the absolute value $\epsilon\theta 2$ of the exerted strain in the circumferential direction of the annular material 10 was 0.7. The annular material 10 obtained by subjecting the annular intermediate 20 to the ring rolling was made to have an outside diameter of about ϕ1050 mm, an inside diameter of about ϕ900 mm (that is, the thickness of about T=75 mm), and a height of about H=90 mm. A plurality of the annular materials 10 was made.

Next, the heat treatment was performed on the annular materials 10. Specifically, from among the annular materials 10, the direct aging materials were subjected to water cooling after ring rolling, and direct aging materials only subjected to a 718° C./8 hours+621° C./8 hours+A. C. aging were made. After the ring rolling, as solution heat treatment+aging materials, after a 970° C./1 hour+W. Q. solution heat treatment or a 980° C./1 hour+W. Q. solution heat treatment, solution heat treatment+aging materials subjected to a 718° C./8 hours+621° C./8 hours+A. C. aging treatment were made. In the following description, from among the solution heat treatment+aging materials mentioned above, the solution heat treatment+aging materials subjected to the 970° C./1 hour+W. Q. solution heat treatment were called "970° C. solution heat treatment+aging materials". The solution heat treatment+aging materials subjected to the 980° C./1 hour+W. Q. solution heat treatment were called "980° C. solution heat treatment+aging materials".

(High-temperature Tensile Property Confirmation Test 1)

Figure 8:
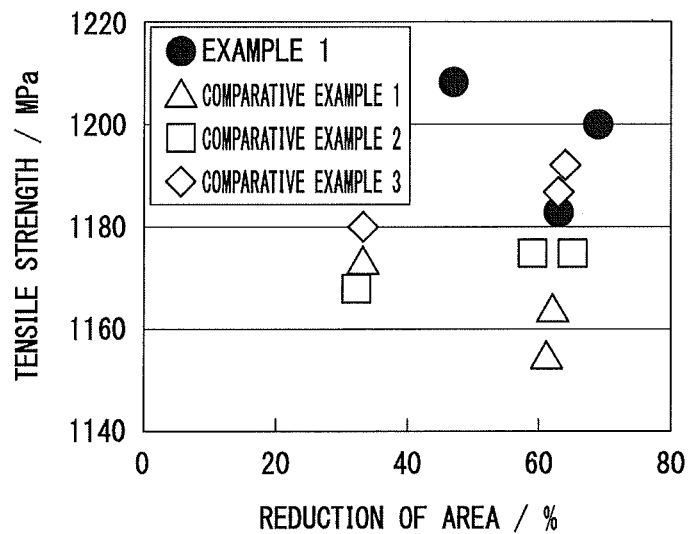
FIG. 8 is a tensile strength-reduction area correlation diagram of the annular material according to an example of the present invention and is a diagram for explaining a comparison to an example according to the related art.
Figure 9:
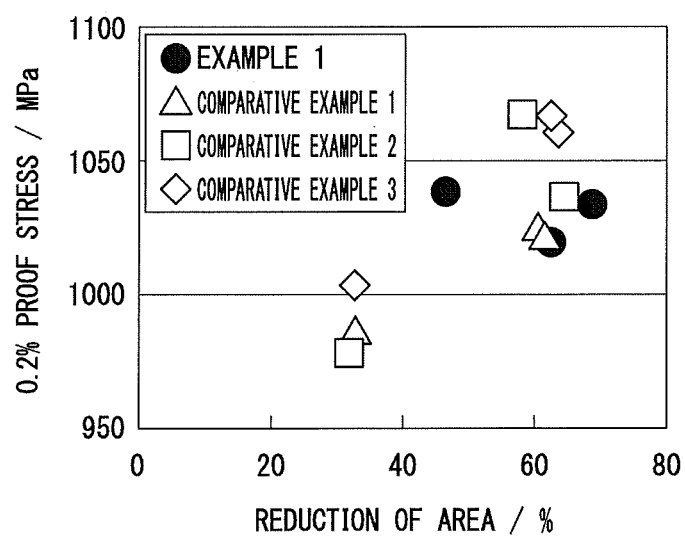
FIG. 9 is a proof stress-reduction area correlation diagram of the annular material according to the example of the present invention and is a diagram for explaining the comparison to the example according to the related art.

From among the annular materials 10 made as described above, using the direct aging materials and the 970° C. solution heat treatment+aging materials, tensile specimens in the circumferential direction, the height direction, and the radial direction were respectively collected from the equivalent positions including the virtual planes VS1 and VS2 of FIG. 1, and a 650° C. high-temperature tensile test was performed. The test was performed on the basis of ASTM E21 using specimens having an ASTM E8 small size with a parallel portion diameter of 6.35 mm, and each of tensile strength, proof stress (0.2% proof stress), and reduction of area was measured. In order to check the deviation in each of the measurement values in the circumferential direction, the height direction, and the radial direction, the ratio in the height direction and the radial direction in a case where the measurement value in the circumferential direction was assumed to be 1 (100%) was calculated. The results are shown in Tables 1 and 2. Regarding the results of measuring the direct aging materials, a tensile strength-reduction of area correlation diagram is shown in FIG. 8. A proof stress-reduction of area correlation diagram is shown in FIG. 9.

TABLE 1

High-temperature Tensile Property 1-1

| | | Forging process | | | Ring rolling process | Heat treatment process | Test Temperature (° C.) | Direction | Ultra tensile strength (MPa) | 0.2% proof stress (MPa) | Reduction of area (%) |
|---|---|---|---|---|---|---|---|---|---|---|---|
| | | $\epsilon_{\theta 1}$ | $\epsilon_h$ | $\epsilon_h/\epsilon_{\theta 1}$ | $\epsilon_{\theta 2}$ | | | | | | |
| Example 1 | (First time) | 0.3 | 0.6 | 2 | 0.7 | Water cooling after ring rolling + aging treatment | 650 | Circumferential direction | 1200 (1.000) | 1033 (1.000) | 69 (1.000) |
| | (Second time) | 1 | 0.7 | 0.7 | | | | Height direction | 1183 (0.986) | 1019 (0.986) | 63 (0.913) |
| | | | | | | | | Radial direction | 1208 (1.007) | 1038 (1.005) | 47 (0.681) |
| Comparative Example 1 | (First time) | 0.6 | 1.2 | 2 | 0.3 | Water cooling after ring rolling + aging treatment | 650 | Circumferential direction | 1155 (1.000) | 1025 (1.000) | 61 (1.000) |
| | (Second time) | 0.6 | 0 | 0 | | | | Height direction | 1164 (1.008) | 1022 (0.997) | 62 (1.016) |
| | | | | | | | | Radial direction | 1174 (1.016) | 986 (0.962) | 33 (0.541) |
| Comparative Example 2 | (First time) | 1.2 | 1.2 | 1 | 0.4 | Water cooling after ring rolling + aging treatment | 650 | Circumferential direction | 1175 (1.000) | 1036 (1.000) | 65 (1.000) |
| | | | | | | | | Height direction | 1175 (1.000) | 1066 (1.029) | 59 (0.908) |
| | | | | | | | | Radial direction | 1168 (0.994) | 977 (0.943) | 32 (0.492) |
| Comparative Example 3 | (First time) | 0.5 | 1 | 2 | 0.4 | Water cooling after ring rolling + aging treatment | 650 | Circumferential direction | 1187 (1.000) | 1066 (1.000) | 63 (1.000) |
| | (Second time) | 0.7 | 0.2 | 0.3 | | | | Height direction | 1192 (1.004) | 1060 (0.994) | 64 (1.016) |
| | | | | | | | | Radial direction | 1160 (0.994) | 1003 (0.941) | 33 (0.524) |
| | | | | | | | | Examples min | (0.986) | (0.986) | (0.681) |
| | | | | | | | | max | (1.007) | (1.005) | (1.000) |
| | | | | | | | Comparative Examples | min | (0.994) | (0.941) | (0.492) |
| | | | | | | | | max | (1.016) | (1.029) | (1.016) |

TABLE 2

High-temperature Tensile Property 1-2

| | | Forging process | | | Ring rolling process | Heat treatment process | Test Temperature (° C.) | Direction | Ultra tensile strength (MPa) | 0.2% proof stress (MPa) | Reduction of area (%) |
|---|---|---|---|---|---|---|---|---|---|---|---|
| | | $\epsilon_{\theta 1}$ | $\epsilon_h$ | $\epsilon_h/\epsilon_{\theta 1}$ | $\epsilon_{\theta 2}$ | | | | | | |
| Example 1 | (First time) | 0.3 | 0.6 | 2 | 0.7 | 970° C. melting treatment + aging treatment | 650 | Circumferential direction | 1156 (1.000) | 1005 (1.000) | 69 (1.000) |
| | (Second time) | 1 | 0.7 | 0.7 | | | | Height direction | 1141 (0.987) | 980 (0.975) | 48 (0.696) |
| | | | | | | | | Radial direction | 1160 (1.003) | 1000 (0.995) | 34 (0.493) |
| Comparative Example 1 | (First time) | 0.6 | 1.2 | 2 | 0.3 | 970° C. melting treatment + aging treatment | 650 | Circumferential direction | 1132 (1.000) | 973 (1.000) | 69 (1.000) |
| | (Second time) | 0.6 | 0 | 0 | | | | Height direction | 1150 (1.016) | 995 (1.023) | 66 (0.957) |
| | | | | | | | | Radial direction | 1133 (1.001) | 934 (0.960) | 38 (0.551) |
| Comparative Example 2 | (First time) | 1.2 | 1.2 | 1 | 0.4 | 970° C. melting treatment + aging treatment | 650 | Circumferential direction | 1148 (1.000) | 995 (1.000) | 68 (1.000) |
| | | | | | | | | Height direction | 1154 (1.005) | 995 (1.000) | 65 (0.956) |
| | | | | | | | | Radial direction | 1143 (0.996) | 952 (0.957) | 30 (0.444) |
| Comparative Example 3 | (First time) | 0.5 | 1 | 2 | 0.4 | 970° C. melting treatment + aging treatment | 650 | Circumferential direction | 1117 (1.000) | 953 (1.000) | 68 (1.000) |
| | (Second time) | 0.7 | 0.2 | 0.3 | | | | Height direction | 1147 (1.027) | 992 (1.041) | 68 (1.000) |
| | | | | | | | | Radial direction | 1141 (1.021) | 943 (0.990) | 37 (0.544) |
| | | | | | | | | Examples min | (0.987) | (0.975) | (0.493) |
| | | | | | | | | max | (1.003) | (1.000) | (1.000) |
| | | | | | | | Comparative Examples | min | (0.996) | (0.957) | (0.444) |
| | | | | | | | | max | (1.027) | (1.041) | (1.000) |

(High-temperature Tensile Property Confirmation Test 2)

From among the made annular materials 10, using the direct aging materials, the 970° C. solution heat treatment+ aging materials and the 980° C. solution heat treatment+ aging materials, tensile specimens in the circumferential direction (three points), the height direction, and the radial direction were respectively collected from arbitrary positions excluding the virtual planes VS1 and VS2. Each of a 400° C. high-temperature tensile test and the 650° C. high-temperature tensile test was performed. The results are shown in Table 3.

TABLE 3

High-temperature Tensile Property 2

| | | Forging process | | | Ring rolling process | Heat treatment process | Test Temperature (° C.) | Direction/position | Ultra tensile strength (MPa) | 0.2% proof stress (MPa) | Reduction of area (%) |
|---|---|---|---|---|---|---|---|---|---|---|---|
| | | $\epsilon_{\theta 1}$ | $\epsilon_h$ | $\epsilon_h/\epsilon_{\theta 1}$ | $\epsilon_{\theta 2}$ | | | | | | |
| Example 1 | (First time) | 0.3 | 0.6 | 2 | 0.7 | Water cooling after ring rolling + aging treatment | 400 | Circumferential direction/position I | 1329 (1.000) | 1160 (1.000) | 39 (1.000) |
| | (Second time) | 1 | 0.7 | 0.7 | | | | Circumferential direction/position II | 1336 (1.005) | 1183 (1.020) | 41 (1.051) |
| | | | | | | | | Circumferential direction/position III | 1347 (1.014) | 1171 (1.009) | 39 (1.000) |
| | | | | | | | | Height direction | 1331 (1.002) | 1149 (0.991) | 34 (0.872) |
| | | | | | | | | Radial direction | 1314 (0.989) | 1115 (0.961) | 33 (0.846) |
| | | | | | | | 650 | Circumferential direction/position I | 1198 (1.000) | 1074 (1.000) | 67 (1.000) |
| | | | | | | | | Circumferential direction/position II | 1211 (1.011) | 1079 (1.005) | 68 (1.015) |
| | | | | | | | | Circumferential direction/position III | 1211 (1.011) | 1055 (0.982) | 65 (0.970) |
| | | | | | | | | Height direction | 1203 (1.004) | 1051 (0.979) | 48 (0.716) |
| | | | | | | | | Radial direction | 1184 (0.988) | 1030 (0.959) | 61 (0.910) |
| | | | | | | 970° C. melting treatment + aging treatment | 400 | Circumferential direction/position I | 1286 (1.000) | 1081 (1.000) | 41 (1.000) |
| | | | | | | | | Circumferential direction/position II | 1304 (1.014) | 1074 (0.994) | 43 (1.049) |
| | | | | | | | | Circumferential direction/position III | 1297 (1.009) | 1089 (1.007) | 42 (1.024) |
| | | | | | | | | Height direction | 1300 (1.011) | 1094 (1.012) | 32 (0.780) |
| | | | | | | | | Radial direction | 1293 (1.005) | 1035 (0.957) | 35 (0.854) |
| | | | | | | | 650 | Circumferential direction/position I | 1144 (1.000) | 976 (1.000) | 66 (1.000) |
| | | | | | | | | Circumferential direction/position II | 1157 (1.011) | 990 (1.014) | 67 (1.015) |
| | | | | | | | | Circumferential direction/position III | 1162 (1.016) | 1008 (1.033) | 67 (1.015) |
| | | | | | | | | Height direction | 1153 (1.008) | 994 (1.018) | 44 (0.667) |
| | | | | | | | | Radial direction | 1146 (1.002) | 978 (1.002) | 59 (0.894) |
| | | | | | | 980° C. melting treatment + aging treatment | 400 | Circumferential direction/position I | 1282 (1.000) | 1090 (1.000) | 41 (1.000) |
| | | | | | | | | Circumferential direction/position II | 1301 (1.015) | 1066 (0.978) | 44 (1.073) |
| | | | | | | | | Circumferential direction/position III | 1294 (1.009) | 1112 (1.020) | 43 (1.049) |
| | | | | | | | | Height direction | 1305 (1.018) | 1092 (1.002) | 36 (0.878) |
| | | | | | | | | Radial direction | 1288 (1.005) | 1057 (0.970) | 32 (0.780) |
| | | | | | | | 650 | Circumferential direction/position I | 1151 (1.000) | 994 (1.000) | 68 (1.000) |
| | | | | | | | | Circumferential direction/position II | 1132 (0.983) | 984 (0.990) | 65 (0.956) |
| | | | | | | | | Circumferential direction/position III | 1167 (1.014) | 1031 (1.037) | 68 (1.000) |
| | | | | | | | | Height direction | 1153 (1.002) | 978 (0.984) | 48 (0.706) |
| | | | | | | | | Radial direction | 1146 (0.996) | 981 (0.987) | 55 (0.809) |
| | | | | | | | | min | (0.983) | (0.957) | (0.667) |
| | | | | | | | | max | (1.018) | (1.037) | (1.073) |

(Grain Size Measurement)

In addition, from among the made annular materials 10, using the direct aging materials and the 970° C. solution heat treatment+aging materials, grain sizes of the center and four points of the outer circumference in the product region in the cross-section including the virtual planes VS1 and VS2 were measured for comparison. The results are shown in Table 4.

TABLE 4

Grain Size Measurement

| Classification | | Forging process | | | Ring rolling process | Heat treatment process | Evaluation position | Grain size [ASTM No.] | | | | | Maximum grain size difference in same surface | Maximum grain size difference between equivalent positions |
|---|---|---|---|---|---|---|---|---|---|---|---|---|---|---|
| | | | | | | | | Center portion | Outer circumference portion 1 | Outer circumference portion 2 | Outer circumference portion 3 | Outer circumference portion 4 | | |
| | | $\epsilon_{\theta 1}$ | $\epsilon_h$ | $\epsilon_h/\epsilon_{\theta 1}$ | $\epsilon_{\theta 2}$ | | | | | | | | | |
| Example 1 | (First time) | 0.3 | 0.6 | 2 | 0.7 | Water cooling after ring | 0° (VS1) | 11.0 | 12.0 | 13.0 | 12.5 | 13.0 | 2.0 | 2.0 |
| | (Second time) | 1 | 0.7 | 0.7 | | | | 11.0 | 13.0 | 12.0 | 11.5 | 12.5 | | |
| | | | | | | | 180° (VS2) | 9.5 | 11.0 | 12.5 | 12.0 | 11.5 | 3.0 | |

TABLE 4-continued

Grain Size Measurement

| Classification | Forging process $\epsilon_{\theta 1}$ | $\epsilon_h$ | $\epsilon_h/\epsilon_{\theta 1}$ | Ring rolling process $\epsilon_{\theta 2}$ | Heat treatment process | Evaluation position | Grain size [ASTM No.] Center portion | Outer circumference portion 1 | Outer circumference portion 2 | Outer circumference portion 3 | Outer circumference portion 4 | Maximum grain size difference in same surface | Maximum grain size difference between equivalent positions |
|---|---|---|---|---|---|---|---|---|---|---|---|---|---|
| | | | | | rolling + aging treatment | | 9.5 | 11.0 | 11.5 | 11.5 | 11.0 | | |
| | | | | | 970° C. melting treatment + aging treatment | 0° (VS1) | 10.5 | 12.0 | 10.5 | 10.5 | 11.5 | 2.0 | 1.0 |
| | | | | | | | 10.5 | 11.5 | 11.0 | 10.0 | 11.0 | | |
| | | | | | | 180° (VS2) | 10.5 | 11.0 | 11.0 | 10.0 | 11.5 | 2.0 | |
| | | | | | | | 9.5 | 11.0 | 11.0 | 10.0 | 10.5 | | |
| Example 2 | (First time) 0.3 | 0.6 | 2 | 0.3 | Water cooling after ring rolling + aging treatment | 0° (VS1) | 8.5 | 7.5 | 9.5 | 9.5 | 10.5 | 3.0 | — |
| | (Second time) 1 | 0.7 | 0.7 | | | | 9.0 | 9.0 | 9.0 | 8.0 | 10.5 | | |
| Example 3 | (First time) 0.3 | 0.6 | 2 | 0.5 | 970° C. melting treatment + aging treatment | 0° (VS1) | 11.0 | 11.0 | 11.5 | 11.5 | 12.0 | 1.0 | 3.5 |
| | (Second time) 0.3 | 0.6 | 2 | | | | 11.0 | 11.0 | 12.0 | 12.0 | 12.0 | | |
| | | | | | | 180° (VS2) | 10.5 | 11.5 | 10.5 | 11.0 | 11.0 | 3.0 | |
| | | | | | | | 10.5 | 11.0 | 8.5 | 11.0 | 11.5 | | |
| Comparative Example 1 | (First time) 0.6 | 1.2 | 2 | 0.3 | Water cooling after ring rolling + aging treatment | 0° (VS1) | 10.5 | 9.5 | 10.0 | 10.0 | 9.5 | 2.0 | 4.0 |
| | (Second time) 0.6 | 0 | 0 | | | | 9.5 | 9.5 | 10.5 | 8.5 | 10.0 | | |
| | | | | | | 180° (VS2) | 10.0 | 10.0 | 10.5 | 9.5 | 10.5 | 6.0 | |
| | | | | | | | 9.5 | 10.0 | 7.5 | 4.5 | 10.0 | | |

Example 2

(Making of Specimen)

As in Example 1, after making a billet through three melting processes, the forging process was performed on the billet, thereby making the discoid forged material.

Next, the through-hole was formed in the center portion of the forged material by the water cutter, thereby making the annular intermediate 20. The annular intermediate 20 was made so that the ratio T/H of the thickness T and the height H was T/H=1.4.

Next, the ring rolling was performed on the annular intermediate 20. As the ring rolling, the hot rolling in which the annular intermediate 20 was heated to a temperature of 1000° C. was performed once. Due to the hot rolling, 0.3 of the absolute value $\epsilon_{\theta 2}$ of the strain in the circumferential direction of the annular material 10 was exerted. The annular material 10 obtained by subjecting the annular intermediate 20 to the ring rolling was made to have an outside diameter of about ϕ680 mm, an inside diameter of about ϕ420 mm (that is, the thickness of about T=130 mm), and a height of about H=90 mm. Next, the annular material 10 was subjected to the heat treatment described in Example 1 to obtain a direct aging material.

(Grain Size Measurement)

Using the annular materials 10 made as such (direct aging material), grain sizes of the center and four points of the outer circumference in the product region in the cross-section including the virtual plane VS1 were measured.

Example 3

(Making of Specimen)

As in Example 1, after making a billet through three melting processes, the forging process was performed on the billet, thereby making the discoid forged material. As the forging work, the hot forging in which the billet was heated to a temperature of 1000° C. was performed twice. Each of both the first and second hot forging processes was performed so that the absolute value $\epsilon_{\theta 1}$ of the strain in the circumferential direction of the forged material was 0.3, the absolute value $\epsilon h$ of the strain in the height direction of the forged material was 0.6, and the ratio $\epsilon h/\epsilon_{\theta 1}$ between the absolute values of the strains was 2.

Next, the through-hole was formed in the center portion of the forged material by the water cutter, thereby making the annular intermediate 20. The annular intermediate 20 was made so that the ratio T/H of the thickness T and the height H was T/H=0.4.

Next, the ring rolling was performed on the annular intermediate 20. As the ring rolling, the hot rolling in which the annular intermediate 20 was heated to a temperature of 1000° C. was performed twice. Due to the hot rolling performed twice, the total of the absolute value $\epsilon_{\theta 2}$ of the exerted strain in the circumferential direction of the annular material 10 was 0.5. The annular material 10 obtained by subjecting the annular intermediate 20 to the ring rolling was made to have an outside diameter of about ϕ620 mm, an inside diameter of about ϕ530 mm (that is, the thickness of about T=45 mm), and a height of about H=180 mm. Next, the annular material 10 was subjected to the heat treatment described in Example 1 to obtain a 970° C. solution heat treatment+aging material.

(Grain Size Measurement)

Using the annular materials 10 made as such (970° C. solution heat treatment+aging material), grain sizes of the center and four points of the outer circumference in the product region in the cross-section including the virtual planes VS1 and VS2 were measured.

Comparative Example 1

(Making of Specimen)

As Comparative Example 1, an annular material was prepared in the following order.

First, a columnar billet having a diameter of ϕ178 mm was made.

Next, a discoid forged material was made by performing a forging process on the billet. As the forging, the hot forging in which the billet was heated to a temperature of 1000° C. was performed twice. The first hot forging was performed so that the absolute value $\epsilon\theta1$ of the strain in the circumferential direction of the forged material was 0.6, the absolute value ϵh of the strain in the height direction of the forged material was 1.2, and the ratio $\epsilon h/\epsilon\theta1$ between the absolute values of the strains was 2. The second hot forging was performed so that the absolute value $\epsilon\theta1$ of the strain in the circumferential direction of the forged material was 0.6, the absolute value ϵh of the strain in the height direction of the forged material was 0 (that is, the ratio $\epsilon h/\epsilon\theta1$ was also 0).

Next, a through-hole was formed in the forged material to obtain an annular intermediate, and ring rolling was performed on the annular intermediate. As the ring rolling, hot rolling in which the annular intermediate was heated to a temperature of 1000° C. was performed once. Due to the hot rolling, 0.3 of the absolute value $\epsilon\theta2$ of the strain in the circumferential direction of an annular material was exerted. The annular material obtained as such was made to have an outside diameter of about ϕ400 mm, an inside diameter of about ϕ270 mm (that is, the thickness of about T=65 mm), and a height of about H=120 mm. A plurality of the annular materials was made.

Next, the heat treatment was performed on the annular materials. Specifically, by performing the heat treatment described in Example 1 on the annular materials, direct aging materials and 970° C. solution heat treatment+aging materials were prepared.

For the rest, specimens were made under the same conditions as in Example 1, and various measurements were performed. Specifically, the high-temperature tensile property confirmation test 1 was performed on each of the direct aging materials and the 970° C. solution heat treatment+aging materials, and the grain size measurement was performed on the direct aging materials.

Comparative Example 2

(Making of Specimen)

As Comparative Example 2, after making a billet as in Comparative Example 1, a forging process was performed on the billet, thereby making a discoid forged material. As the forging work, hot forging in which the billet was heated to a temperature of 1000° C. was performed once. The hot forging was performed so that the absolute value $\epsilon\theta1$ of the strain in the circumferential direction of the forged material was 1.2, the absolute value ϵh of the strain in the height direction of the forged material was 1.2, and the ratio $\epsilon h/\epsilon\theta1$ between the absolute values of the strains was 1.

Next, ring rolling was performed on an annular intermediate obtained by forming a through-hole in the forged material. As the ring rolling, the hot rolling in which the annular intermediate was heated to a temperature of 1000° C. was performed once. Due to the hot rolling, 0.4 of the absolute value $\epsilon\theta2$ of the strain in the circumferential direction of the annular material was exerted. The annular material obtained as such was made to have an outside diameter of about ϕ430 mm, an inside diameter of about ϕ320 mm (that is, the thickness of about T=55 mm), and a height of about H=120 mm.

Next, by performing a heat treatment on the annular material, direct aging materials and 970° C. solution heat treatment+aging materials were prepared.

For the rest, specimens were made under the same conditions as in Example 1, and the high-temperature tensile property confirmation test 1 was performed on each of the direct aging materials and the 970° C. solution heat treatment+aging materials.

Comparative Example 3

(Making of Specimen)

As Comparative Example 3, after making a billet as in Comparative Example 1, a forging process was performed on the billet, thereby making a discoid forged material. As the forging work, hot forging in which the billet was heated to a temperature of 1000° C. was performed twice. The first hot forging was performed so that the absolute value $\epsilon\theta1$ of the strain in the circumferential direction of the forged material was 0.5, the absolute value ϵh of the strain in the height direction of the forged material was 1, and the ratio $\epsilon h/\epsilon\theta1$ between the absolute values of the strains was 2. The second hot forging was performed so that the absolute value $\epsilon\theta1$ of the strain in the circumferential direction of the forged material was 0.7, the absolute value ϵh of the strain in the height direction of the forged material was 0.2, and the ratio $\epsilon h/\epsilon\theta1$ between the absolute values of the strains was 0.3.

For the rest, specimens were made under the same conditions as in Comparative Example 2, and the high-temperature tensile property confirmation test 1 was performed on each of direct aging materials and 970° C. solution heat treatment+aging materials.

(Evaluation)

As shown in Table 1 and FIGS. 8 and 9, as a result of the high-temperature tensile property confirmation test 1 using the direct aging materials, it was confirmed that all of the tensile strength, the 0.2% proof stress, and the reduction of area in Example 1 were superior to those in Comparative Examples 1 to 3. That is, it was found that a fine grain structure in which the isotropy of strength property was increased and uniformity was sufficiently ensured was included in Example 1.

Specifically, in Example 1, the ultimate tensile strength was ensured to be 1183 MPa or higher, the 0.2% proof stress was ensured to be 1019 MPa or higher, the reduction of area was ensured to be 47% or higher, and the deviation of the measurement values in the height direction and the radial direction with respect to the measurement values in the circumferential direction was suppressed to be 1.4% or less in terms of ultimate tensile strength, 1.4% or less in terms of 0.2% proof stress, and 31.9% in terms of reduction of area.

On the other hand, in Comparative Example 1, the ultimate tensile strength was 1155 MPa or higher, the 0.2% proof stress was 986 MPa or higher, and the reduction of area was 33% or higher. In Comparative Example 2, the ultimate tensile strength was 1168 MPa or higher, the 0.2% proof stress was 977 MPa or higher, and the reduction of area was 32% or higher. In Comparative Example 3, the ultimate tensile strength was 1160 MPa or higher, the 0.2% proof stress was 1003 MPa or higher, and the reduction of area was 33% or higher. In addition, in Comparative Examples 1 to 3, the deviation of the measurement values in the height direction and the radial direction with respect to the measurement values in the circumferential direction was suppressed to be 1.6% or less in terms of ultimate tensile strength, 5.9% or less in terms of 0.2% proof stress, and 50.8% in terms of reduction of area.

As shown in Table 2, it was found that even according to the result of the high-temperature tensile property confirmation test 1 using the 970° C. solution heat treatment+ aging materials, Example 1 was superior to Comparative Examples 1 to 3, and a fine grain structure in which the isotropy of strength property was increased and uniformity was sufficiently ensured was included.

As shown in Table 3, as a result of the high-temperature tensile property confirmation test 2, it was confirmed that the performance was stably ensured in Example 1 regardless of the heat treatment process (the direct aging materials, the 970° C. solution heat treatment+aging materials, and the 980° C. solution heat treatment+aging materials), the test temperature (400° C. and 650° C.), and the measurement positions (I, II, and III in the circumferential direction, the height direction, and the radial direction).

As shown in Table 4, as a result of the grain size measurement, it was confirmed that in Examples 1 to 3, all the grain sizes were greater than or equal to 7.5 in terms of ASTM grain size number and thus the fineness of the structure was sufficiently increased. In particular, in Example 1, all the ASTM grain size numbers were greater than or equal to 9.5. On the other hand, in Comparative Example 1, the grain sizes were greater than or equal to 4.5 in terms of ASTM grain size number.

In Examples 1 to 3, the maximum grain size difference in the same cross-section (VS1 or VS2) was suppressed to be less than or equal to 3 (in a range of ±1.5) as an ASTM grain size number difference. On the other hand, in Comparative Example 1, the maximum grain size difference in the same cross-section was suppressed to be less than or equal to 6 (in a range of ±3) as an ASTM grain size number difference.

In Examples 1 to 3, the maximum grain size difference between the equivalent positions was suppressed to be less than or equal to 3.5 (in a range of ±1.8) as an ASTM grain size number difference. In particular, in Example 1 in which the T/H of the annular intermediate 20 was set to be in a range of 0.6 to 2.3, the maximum grain size difference between the equivalent positions was suppressed to be less than or equal to 2 (in a range of ±1) as an ASTM grain size number difference. On the other hand, in Comparative Example 1, the maximum grain size difference between the equivalent positions reached 4 (in a range of ±2) as an ASTM grain size number difference.

While preferred embodiments of the present invention have been described, the present invention is not limited to the embodiments. Additions, omissions, substitutions, and other modifications of the configurations can be made without departing from the spirit or scope of the present invention. The invention is not to be considered as being limited by the foregoing description, and is only limited by the scope of the appended claims.

What is claimed is:

1. A method of manufacturing an annular material comprising:
a forging process of making a discoid forged material by forging an alloy material; and
a ring rolling process of making an annular material by performing ring rolling on an annular intermediate made by forming a through-hole in the forged material,
wherein, in the forging process, hot forging is performed at least twice in such a way that an absolute value $\epsilon\theta 1$ of a strain in a circumferential direction of the forged material that is greater than or equal to 0.3, an absolute value $\epsilon h$ of a strain in a height direction of the forged material that is greater than or equal to 0.3, and a ratio $\epsilon h/\epsilon\theta 1$ between the absolute values of the strains that is in a range of 0.4 to 2.5;
the method further comprising an annular intermediate material preparing process by boring the discoid forged material to form a through-hole therein in such a way that a ratio T/H of a thickness T of the annular intermediate material in a radial direction orthogonal to the axial line direction to the height H is set in a range of 0.6 to 2.3, wherein
the annular material is for a turbine disk of an aircraft engine,
the discoid formed material obtained in the forming process has a height H along an axial line direction of the discoid forged material of 60 mm to 500 mm, and
$\epsilon h$ is obtained by a formula (1):

$$|\epsilon h| = \left|\ln\left(\frac{h_1}{h_0}\right)\right|, \quad (1)$$

$h_0$ and $h_1$ being lengths in a height direction before and after forging, respectively, and
$\epsilon\theta 1$ is obtained by a formula (2):

$$|\epsilon\theta| = \left|\ln\left(\frac{\theta_1}{\theta_0}\right)\right|, \quad (2)$$

$\theta_0$ and $\theta_1$ being average radiuses before and after forging, respectively.

2. The method of manufacturing an annular material according to claim 1,
wherein, in the ring rolling process, hot rolling in which 0.5 or higher of an absolute value $\epsilon\theta 2$ of the strain in the circumferential direction in the annular material is exerted is performed, and
a grain size of a product region in the annular material is greater than or equal to 8 in terms of ASTM grain size number.

3. The method of manufacturing an annular material according to claim 2,
wherein a grain size difference in the product region of the annular material in a cross-section including an axial line of the annular material is in a range of ±2 as an ASTM grain size number difference.

4. The method of manufacturing an annular material according to claim 1,
wherein, in the forging process, a grain size of the forged material is caused to be greater than or equal to 7 in terms of ASTM grain size number.

5. The method of manufacturing an annular material according to claim 1,
wherein the annular intermediate is made so that a ratio T/H of a thickness T in a radial direction in the annular intermediate and a height H along an axial direction of the annular intermediate is in a range of 0.6 to 2.3 and is thereafter subjected to ring rolling to cause a grain size difference between a plurality of equivalent positions equally set in the circumferential direction in the annular material to be in a range of ±1.5 as an ASTM grain size number difference.

6. The method of manufacturing an annular material according to claim 1,
wherein a temperature of the ring rolling process is in a range of 900 to 1050° C.

7. The method of manufacturing an annular material according to claim 1,
wherein a temperature of the forging process is in a range of 950 to 1075° C.

8. The method of manufacturing an annular material according to claim 1,
wherein, in the forging process, the absolute value $\epsilon\theta 1$ is set to be in a range of 0.3 to 1.3, and the absolute value $\epsilon h$ is set to be in a range of 0.3 to 1.3.

9. The method of manufacturing an annular material according to claim 1,
wherein, in the ring rolling process, the absolute value $\epsilon\theta 2$ is set to be in a range of 0.5 to 1.3.

* * * * *